United States Patent [19]

Merz

[11] 4,319,642
[45] Mar. 16, 1982

[54] WEED AND GRASS REMOVING TOOL

[76] Inventor: William J. Merz, 220 W. Rittenhouse Sq., Philadelphia, Pa. 19103

[21] Appl. No.: 156,916

[22] Filed: Jun. 6, 1980

[51] Int. Cl.³ .............................................. A01B 1/16
[52] U.S. Cl. .................................... 172/13; 172/360; 172/371; 56/400.15
[58] Field of Search .................... 172/13, 17, 371, 378, 172/379, 375, 380, 393, 430, 360, 361, 764; 56/400.14, 400.15; 254/131.5, 132; D8/13, DIG. 7; 15/105.5, 235.3; 43/23

[56] References Cited

U.S. PATENT DOCUMENTS

| | | | |
|---|---|---|---|
| 223,921 | 1/1880 | Johnson et al. | 56/400.15 |
| 757,123 | 4/1904 | Kampfe | 56/400.15 X |
| 918,239 | 4/1909 | Wheeler | 172/17 |
| 954,747 | 4/1910 | Lindsey | 172/17 X |
| 954,792 | 4/1910 | Graham | 172/17 |
| 1,193,478 | 8/1916 | Downs | 15/235.3 |
| 1,239,735 | 9/1917 | Smith et al. | 56/400.15 |
| 1,761,858 | 6/1930 | Werk | 172/17 X |
| 1,941,548 | 1/1934 | Friedheim | 172/17 |
| 2,083,922 | 6/1937 | Roessel | 56/400.15 X |
| 2,450,236 | 9/1948 | Hoffman | 172/357 |
| 2,743,658 | 3/1956 | Wynstra | 172/13 |
| 2,989,836 | 6/1961 | Schaffer | 56/400.15 |
| 3,232,355 | 2/1966 | Woolworth | 172/378 |
| 3,451,156 | 6/1969 | Barnes | 43/23 X |
| 3,678,670 | 7/1972 | Welz | 56/400.14 |
| 4,042,037 | 8/1977 | Whiteley | 172/13 |

Primary Examiner—Richard T. Stouffer
Attorney, Agent, or Firm—Synnestvedt & Lechner

[57] ABSTRACT

A hand tool for grooming outdoor terraces, comprising a weed hook and associated handle together with gauge structure limiting the depth to which the hook may penetrate. It is used primarily for removing grass, weeds or other debris from cracks or grooves in terraces or paved walks.

7 Claims, 9 Drawing Figures

U.S. Patent  Mar. 16, 1982  Sheet 1 of 2  4,319,642
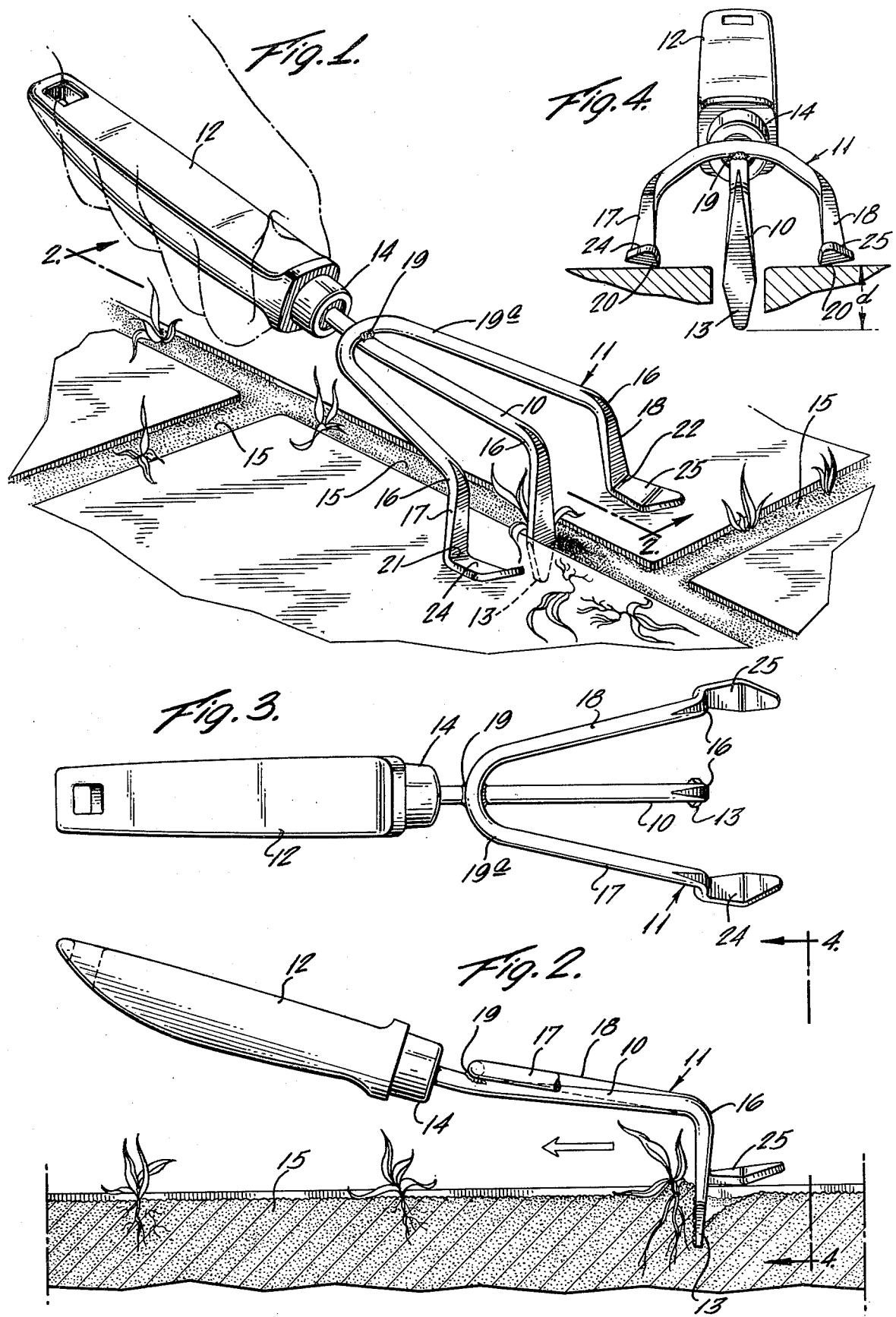

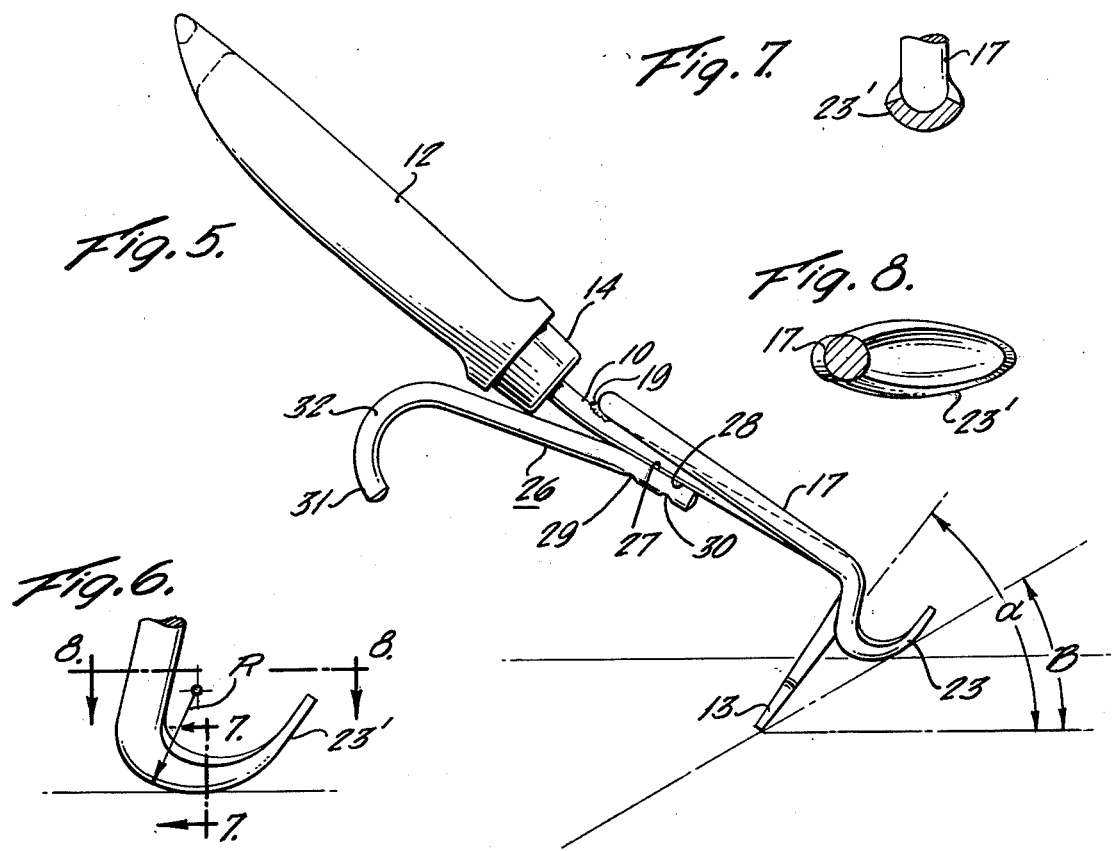
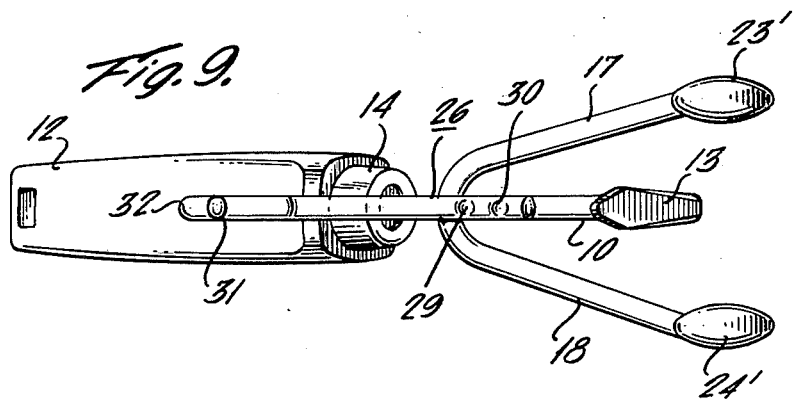

WEED AND GRASS REMOVING TOOL

This invention relates to a weeding tool, preferably hand-held, for removing weeds or debris from the spaces adjacent the edges of paving elements, such as stones, bricks or blocks. It is particularly useful in "grooming" outdoor terraces having grooves in their working surfaces. It is also useful as a cleaning tool, prior to "pointing" masonry.

The tool of this invention comprises a three-tined claw, of a type in which the tines extend forwardly, fan-wise or in parallel relationship, from the forward end of a handle in which they are firmly mounted, and are bent downward in a plane which is generally normal to that in which the shanks of the tines lie. It differs from weeding claws, long known in the gardening field, in that, in the present invention, the working tips of the two outer tines do not point in a downward direction (as the central tine does) but have their tip portions bent forwardly, at right angles to the central tine, and formed, preferably to a radius, at a locus between the level of the tip of the central tine and the plane in which the shanks lie.

The forwardly-extending tips of the outer tines thus serve to limit the depth to which the central tine may penetrate, and aid in resisting twisting in the hand. By tilting the tool up or down, the depth of penetration can be controlled from no bite to a maximum bite. This is an important advantage, since failure to provide some means for limiting the depth of cultivation has impaired the use of claw-type and related weeding tools.

One of the chief advantages of the present invention is its simplicity. Claw-type tools of several forms are available, yet, somehow, no tool having the sturdy simplicity of the present invention appears to be commercially known. The claw-type tools just do not seem to lend themselves to terrace care.

The device itself can be readily produced by simple modification of weeding claws presently available. It is sturdy, effective and inexpensive.

These and other objects and advantages of the invention will become apparent as this description proceeds, particularly with reference to the accompanying drawings of a preferred embodiment in which:

FIG. 1 is a perspective view of the tool of this invention.

FIG. 2 is a sectional side-elevational view taken along the line 2—2 of FIG. 1.

FIG. 3 is a plan view.

FIG. 4 is an end elevation, along the line 4—4 of FIG. 2.

FIG. 5 is a side-elevational view similar to FIG. 2 illustrating parts of FIG. 2.

FIG. 6 is a fragmentary elevational view of one of the shoes illustrated in FIG. 5.

FIG. 7 is a fragmentary transverse sectional view through the shoe shown in FIG. 6, taken on the line 7—7 of FIG. 6.

FIG. 8 is a sectional plan view taken on the line 8—8 of FIG. 6.

FIG. 9 is a bottom plan view of the device shown in FIG. 5.

As seen in FIG. 1, the structural core of the tool is the central tine 10 of claw 11. This is anchored in the handle 12, desirably via the ferrule 14. The tine 10 has a downwardly-bent hook or tooth 13 which may be shaped as desired, and which is bent downward at a locus 16 towards the working end of the tine 10. The hook or tooth 13 may be given sharply-defined edges to facilitate its use in scraping debris from the edges of the stones bordering the grooves 15.

On either side of the tine 10, the lateral tines 17-18 are mounted in substantially co-planar relationship, being roughly parallel to the central tine 10. Towards the working end of the tool, each of the tines, 17-18 is bent downwardly, at a locus 16, so that the bent-over portions are approximately parallel. However, at a locus below the plane of the shanks but above the level of the tip of tine 10, the tines 17 and 18 are re-bent in a forward direction—that is, towards the working end of the tool. The arcuate end portions of the tines 17 and 18 thus define bearing surfaces lying below the plane of the shanks, and serving as a depth gauge, limiting the depth of penetration of the tooth 13 into a groove.

The tine elements 17-18 may, if desired, be shaped and oriented to enhance stability of the tool in use. Thus, the lateral tines, 17-18, may be flattened to provide broad contact surfaces 20, at bends 21, 22, which surfaces are canted upwardly and outwardly from these lower bends. If desired, these bearing surfaces 24, 25 may also be canted sidewise, upwardly and outwardly along the line of curvature. This is the form shown in FIGS. 1-4.

Alternatively, it may be desired to retain the circular cross-section of the tine, particularly where the paving is of flagstone or the like. This is shown in FIGS. 5-9.

As is indicated by the arrow in FIG. 2, the tool is ordinarily drawn towards the user. When so used, the tool can rock up on the bearing surfaces at the bends 24, 25 or tilt down about them, so as to alternate working strokes, which remove dirt, with harrowing strokes, which loosen dirt prior to removing it. Yet, at no time can the tooth 13 exceed its working depth. In other words, the bends at 21 and 22 function, because of this freedom to tilt, very much like the arcuate surfaces of a shoe or wheel.

The bearing surfaces not only serve as depth gauges, they also help to prevent the tool from "digging itself in" under the tendency of the hook to go deeper when drawn towards the user. Furthermore, since the forces involved are concentrated about a single focus—the tooth 13—the tool, without the shoes, would have a tendency to wander—that is, to be diverted by minor obstructions, such as small stones. The shoes 24, 25 act as bearing surfaces and tend to resist actions of this type, so that the tool of this invention is more stable in use than it would be if the bearing surfaces had not been provided. It also is less likely to twist in the hand.

The tine elements 17, 18 may be formed from a single rod which is bent upon itself to provide a U-shaped portion 19a which is pinch-welded to the center tine 10 at the transection point 19. Alternatively, the outer tines 17, 18 may be separate elements, mounted in a common header and formed into a unitary assembly by any convenient means.

The flattened bearing surfaces 24, 25, add to the stability of the tool in use, but they have a disadvantage when working on a terrace of flagstone or the like, for they have a tendency to trap stone chips or sharp gravel between their lower bearing surfaces and the upper surface of the flagstone, thus causing scratches or score marks. This possibility is reduced if the tines 17, 18 are given a contour which is arcuate in cross-section, as shown in FIG. 6. A corresponding change is desirably effected in the shape of the bends in the tines 17, 18.

These, instead of being bent to relatively sharp angles, as at 21, 22 in FIG. 1, are shaped to an arcuate form, such as the radius R (seen in FIG. 6). Note that FIG. 5 suggests an optimum angular relationship between the arcuate bearing surface 23 and the angle of the tooth 13.

Since this invention deals with a tool which will most often be hand-held, it will be somewhat less tiring to use if it is provided with a finger grip. I have devised a grip which is both extremely simple and quite effective. This is shown in FIG. 5, as applied to the embodiment shown in FIG. 1. It is formed of a short length of rod stock, 26, flatted at 27 to fit against a similarly flatted portion 28 of the tine 10, the abutting faces being welded as at 29, 30 to each other.

The opposite end 31 of the finger grip 26 is curled into a partial ring 32 to accommodate an index finger of the user. Thus, I have enhanced the usability of the tool without cluttering the space near the handle, while affording protection to the finger of the user.

Use of the tool of this invention has several advantages. The grooming task moves faster, since there is no need to work against the tendency of the hook 13 to dig itself too deeply into the grove. Furthermore, the bearing surfaces make it easier to keep the tool from wandering or rocking laterally upon meeting an obstacle, such as a pebble or root. Still further, the tool may be used to pry obstructions out of the groove because of the leverage available about the bends 21–22, simply by tilting the handle upwardly or downwardly, as the need may be.

I claim:

1. A tool for removing weeds and debris from grooves between paving stones, comprising a handle and a claw rigidly mounted thereto, said claw comprising three tines, in spaced apart side-by-side relationship, each of said tines having a shank and all of said shanks touching a common plane, all of said shanks further being bent downwardly from said plane in a direction substantially normal to said plane, the central one of said tines extending from said plane to a level at the tip thereof ensuring penetration of its tip to the intended maximum depth of cultivation, said tines right and left of said central tine being reversely bent away from said handle and also away from said downward direction at a locus intermediate the plane of the shanks and the level of the tip on said central tine, said tines right and left of said central tine being free of structure in said downward direction lower than the reversely bent portions thereof whereby the reversely bent portions of the right and left tines serve to limit penetration of the central tine into the grooves.

2. A weeding tool as defined in claim 1, wherein the right and left tines have flatted surfaces at their working ends which are canted upwardly and outwardly with respect to the vertical plane in which the downwardly bent portion of the central tine lies.

3. A weeding tool as defined in claim 1, wherein the reversely bent portions of the right and left tines are curved to a radius.

4. A weeding tool as defined in claim 1, wherein the right and left tines have flatted areas which serve as shoes in guiding and supporting the tool in use.

5. A weeding tool as defined in claim 1, wherein the working ends of the right and left tines are round in cross-section, and lengthwise have a curvilinear form.

6. A weeding tool as defined in claim 1, wherein a finger grip is provided, adjacent the handle which is integrally united to the shank of the central tine and projects radially therefrom.

7. A weeding tool as defined in claim 1, in which, when the tip of the central tine lies at an angle of about 52° to the horizontal, the arc of curvature of the reversely bent portions of the right and left tines is such as to afford a bearing point for each of the tines which is at about 30° to the horizontal.

* * * * *